Figure 12B:
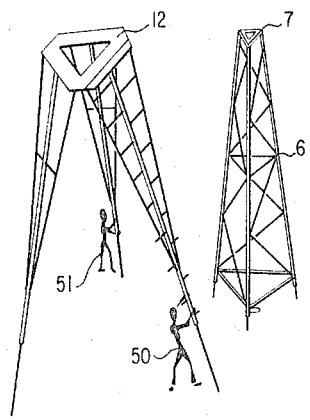

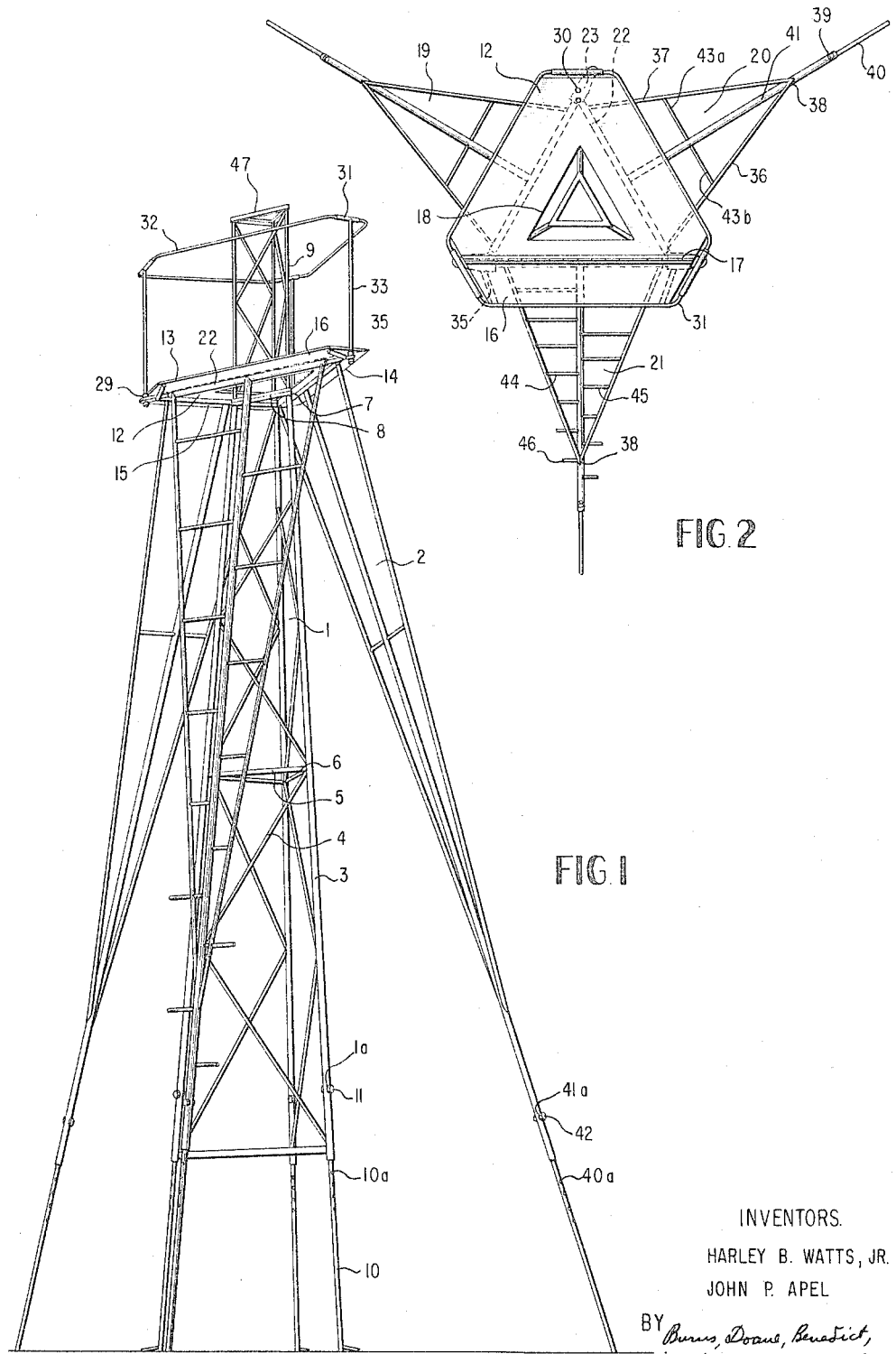

Dec. 6, 1966 H. B. WATTS, JR., ETAL 3,289,364
COMPOSITE TOWER STRUCTURE AND METHODS OF
TOWER ERECTION AND STORAGE
Filed Dec. 9, 1963 4 Sheets-Sheet 2
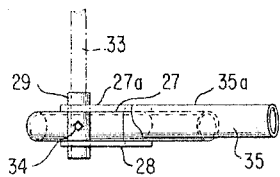
FIG. 4
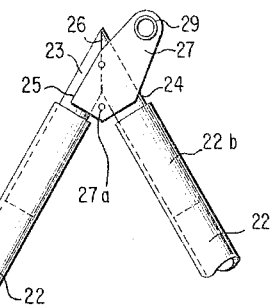
FIG. 3
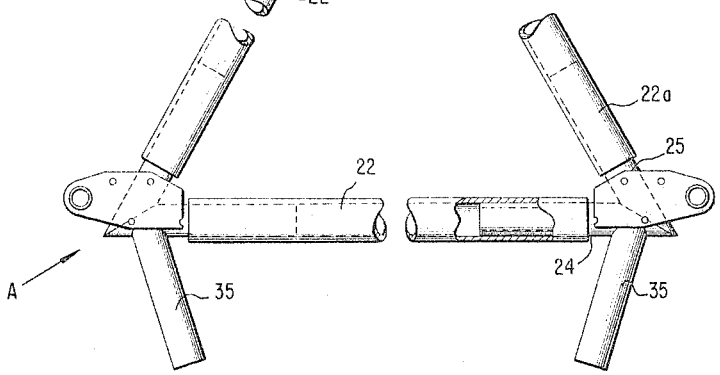
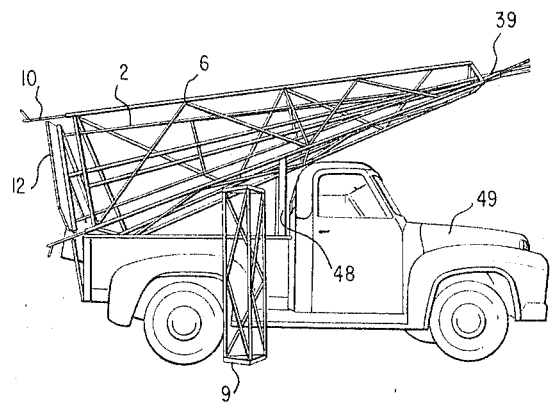
FIG. 5
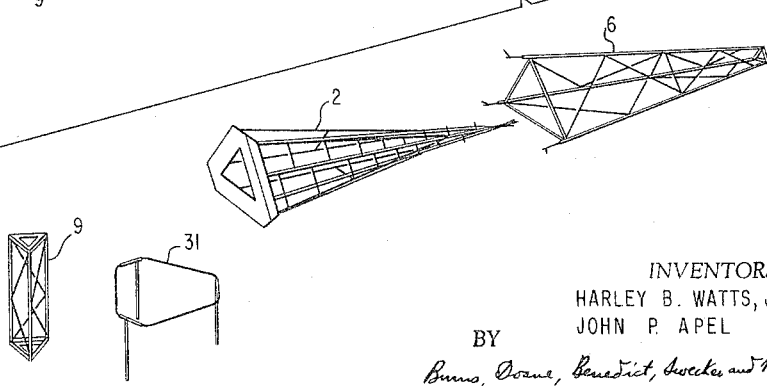
FIG. 6
INVENTORS
HARLEY B. WATTS, JR.
JOHN P. APEL
BY
*Burns, Doane, Benedict, Swecker and Mathis*
ATTORNEYS

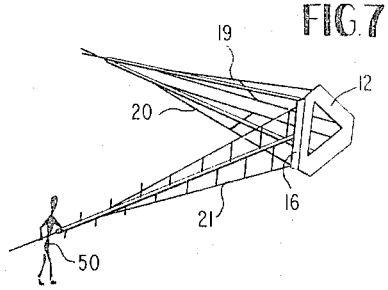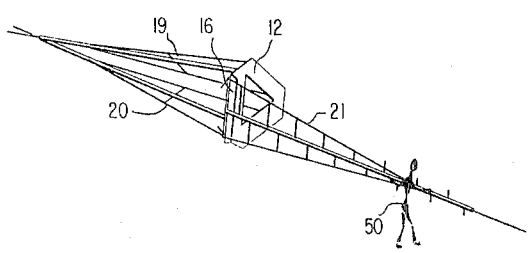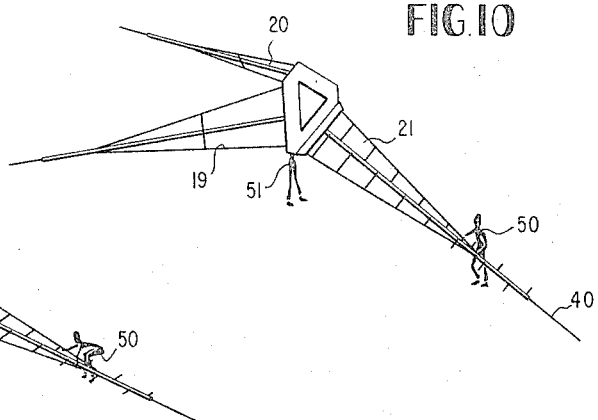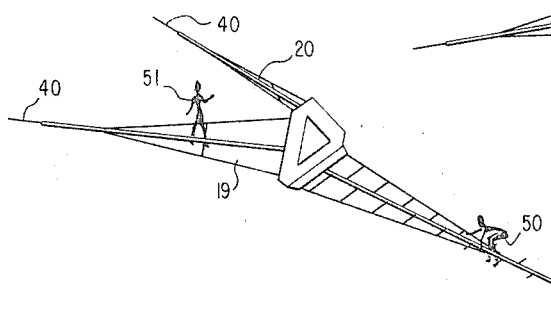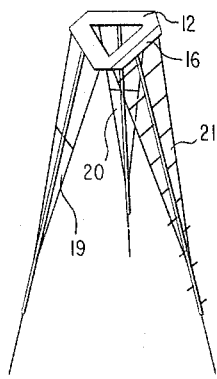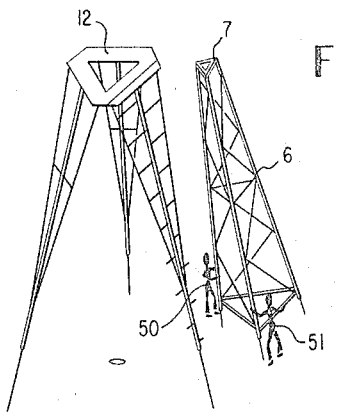

INVENTORS
HARLEY B. WATTS, JR.
JOHN P. APEL
BY

*ATTORNEYS*

United States Patent Office 3,289,364
Patented Dec. 6, 1966

3,289,364
COMPOSITE TOWER STRUCTURE AND METHODS OF TOWER ERECTION AND STORAGE
Harley B. Watts, Jr., and John P. Apel, Columbus, Ohio, assignors to The Thomas Engineering and Surveying Co., Columbus, Ohio
Filed Dec. 9, 1963, Ser. No. 329,026
18 Claims. (Cl. 52—117)

This invention relates to a composite tower structure which includes both inner and outer tower components, and to methods of tower erection and storage. In particular, it relates to such a tower structure which is uniquely adapted for surveying operations where it is desirable to support a surveying instrument in an elevated position and to provide an independent and elevated working platform.

Surveying tower structures which include an inner, surveying instrument supporting tower, and an outer personnel tower, are known in the surveying art. However, composite tower structures previously devised for this purpose have been characterized by certain structural and operational drawbacks.

Composite surveying towers previously developed have often required the assembly of a large number of individual elements in order to effect their erection. As would be expected, the field installation of such towers has proven to be both time consuming and tedious.

The use of entirely prefabricated tower structures, to some degree, would offset the erection problems involved with towers, each component of which must be assembled in the field from a multitude of framing elements. However, such an entirely prefabricated structure would engender significantly disadvantageous storage, handling, and transporting problems. In addition, the erection of such an entirely prefabricated tower structure would be difficult under field conditions where minimum personnel and equipment was available.

Recognizing the need for an improved, composite tower structure uniquely suited for surveying operations, it is an object of this invention to provide such a structure, including mutually independent inner and outer tower components, which avoids deficiencies of structure of the type heretofore described.

It is a further object of the invention to provide such a composite tower structure by means of which tower erection procedures are vastly simplified and the personnel required to effect tower erection minimized.

Still another object of the invention is to provide an improved, composite tower structure which facilitates the storage, transportation, and handling of inner and outer tower components by enabling the nesting of a collapsed outer tower substantially within a rigid, inner tower portion.

An additional object of the invention is to provide a unique hinge arrangement for supporting the legs of an outer tower of a composite tower assembly. This hinge structure is characterized by particular structural ruggedness, provides a reliable and secure pivotable support for tower legs, and materially facilitates the replacement or repairing of damaged leg units.

Other objects of the invention involve the provision of methods for facilitating the erection and storage of inner and outer tower components of a composite tower structure.

The composite tower structure with this invention is concerned, and which is adapted to accomplish the foregoing objectives, includes a rigid inner tower and an outer tower having a top platform with a plurality of legs pivotably connected thereto. The top platform of this outer tower is apertured to allow an upper portion of the inner tower to project therethrough.

The base of the inner tower has a cross-sectional configuration defined by the rigid legs thereof, which cross-sectional configuration is larger than the peripheral configuration of the top portion of the outer tower. The legs of the outer tower are so pivotally mounted as to enable the free extremities thereof to be converged into abutting relationship. The converged extremities of the legs of the outer tower are adapted to be moved from the base portion of the inner tower, through its interior, until the top platform of the outer tower is nested within the base portion of the inner tower.

A unique tower erection method involved in the invention entails the pivoting of one leg of the outer tower about the top platform of this tower until this one leg extends away from the top platform in a direction generally opposite to the direction in which other legs of the outer tower extend. This one leg is pivoted about a hinge axis which extends generally transversely of a surface upon which the tower structure is to be supported. The outer tower is then rotated about its top platform to cause the pivot axis of the one leg to lie adjacent and substantially parallel to this supporting surface. The extremities of the other legs of the outer tower are secured so as to substantially prevent their movement along the supporting surface. The free extremities of the aforesaid one leg are then moved toward the top platform of the outer tower so as to effect the elevation of this platform. Thereafter, the inner and outer towers are relatively positioned so that the legs of the outer tower are positioned outwardly of the inner tower.

A unique tower component storage method with which this invention is concerned entails the pivoting of the legs of the outer tower about the top platform of this tower so as to bring the extremities of these legs into converged relationship. The converged extremities of the legs of the outer tower are then inserted into the base portion of an inner tower. The outer tower is then advanced into the interior of the inner tower until the top platform of the outer tower is telescoped with the base portion of the inner tower.

A unique hinge structure presented through this invention is characterized by a plurality of mutually spaced hinge units which are detachably mounted upon the lower side of the top platform of the outer tower and are adapted to pivotally support the legs of that tower. Each such hinge unit includes a first portion which engages and pivotally supports one side of one tower leg. Each hinge unit further includes a second portion which engages and pivotally supports one side of another tower leg. The first and second portions of each hinge unit are rigidly interconnected with the pivot axes thereof being mutually inclined.

In describing the invention, reference will be made to preferred apparatus embodiments and tower component manipulations which are described with reference to the accompanying drawings.

In the drawings:
FIGURE 1 is a perspective and schematic view illustrating the interrelationship of assembled tower components;
FIGURE 2 is a schematic, top plan view of the assembled components shown in FIGURE 1;
FIGURE 3 is a schematic, top plan view of a hinge arrangement employed to pivotably mount legs on the outer tower shown in FIGURE 1 with this arrangement being illustrated apart from other tower components;
FIGURE 4 is a fragmentary elevational view of the portion of the FIGURE 3 hinge arrangement as viewed along direction A of FIGURE 3;

FIGURE 5 schematically illustrates the manner in which internested tower components may be transported on a small truck;

FIGURE 6 schematically illustrates disassembled principal tower components; and

FIGURES 7 through 16 schematically illustrate modes of erection which may be employed to assemble the tower components shown in FIGURE 6.

The tower embodiment illustrated in FIGURE 1 is particularly suited for use in surveying operations where it is desirable to support a surveying instrument, such as a theodolite, at a point above the ground. This tower is adapted to support such an instrument at a height up to approximately twenty-five feet.

The FIGURE 1 tower structure includes an inner tower 1 and an outer tower 2. Inner tower 1 is fabricated from lightweight tubular stock and includes three corner legs 3 which are interconnected by transverse bracing members such as the inclined struts 4 and the horizontal struts 5. As shown in FIGURES 1 and 2, the tower legs 3, being disposed at each of three tower corners, define a tower cross section of triangular configuration.

The polygonally configured inner tower 1 is rigid in character but may include a lower, inner tower component 6 which terminates at an upper end 7. This tower end is defined by triangularly arranged framing members 8. An upper tower, inner tower component 9, also of triangular cross section, is adapted to be detachably secured to end 7 by conventional fastening means such as threaded nuts and bolts or other clamping arrangements not shown. As shown, upper tower component 9, in essence, defines a continuation of lower tower component 6.

The legs 3 of inner tower 1 may be extensible in character. For example, in a conventional and well-known manner, each leg 1 may be fabricated from tubular stock and have telescoped within its lower portion a leg extension 10. Each leg extension 10 may be moved into or out of its associated leg 1 to a desired position. Each properly positioned extension 10 may be secured by a conventional, schematically shown arrangement which entails a threaded nut and bolt 11 which passes through openings 1a in a leg portion 1 and one of a series of axially spaced openings 10a in the extension 10 of this leg.

Outer tower 2 includes a top platform 12. Platform 12 has a polygonal configuration which is predominantly triangular in character as defined by the sides 13, 14 and 15. One side or lip portion 16 of the top platform 12 may be pivotally joined to the remainder of platform 12 by an elongate conventional hinge 17, the structural details of which are not shown. Hinge 17, for example, may comprise a conventional, elongate piano-type hinge. This hinge is positioned on the top of a platform 12 so as to allow the platform lip portion 16 to be hinged upwardly and laid back on the remainder of the platform 12.

Platform 12 includes a central aperture 18 which may be triangular in configuration as shown in FIGURE 2. Aperture 18 is of such a size as to allow extension portion 9 of inner tower 1 to project therethrough as shown in FIGURE 1.

Outer tower 2 includes three leg units 19, 20 and 21, each of which is pivotably secured to the underside of tower platform 12. The hinge structures which accomplish this pivotable connection are illustrated in FIGURES 2 and 3.

As shown in FIGURES 2 and 3, the top of each leg unit 19, 20, and 21 includes a tubular member 22. Each tubular member 22 is journaled on a pair of hinge units 23. A first cylindrical spindle member 24 and a second cylindrical spindle member 25 of each unit 23 are rigidly connected at a joint 26. Joint 26 may comprise a conventional welded connection. The axes of cylindrical members 24 and 25 are substantially coplanar and generally parallel to the underside of platform 12.

Each hinge unit 23 further includes a pair of generally planar mounting plates 27 and 28 which are secured, as by welding, to opposite sides of spindle members 24 and 25 in parallel relationship as shown in FIGURE 4. A tubular coupling member 29 extends transversely through mounting plates 27 and 28 is adapted to support a portion of a tower railing structure in a manner to be hereinafter described. This composite hinge structure is both compact and rugged, in no small part due to the sandwiching of the spindles between the plates 27 and 28.

In a preferred tower hinge arrangement, three hinge units 23 are disposed at the truncated corner portions of triangular platform 12 as shown in FIGURE 2. With this arrangement, each tubular portion 22 of each tower leg is supported by a pair of hinge units 23. A spindle 25 of a hinge unit 23 telescopingly extends into one end 22a of a tubular portion 22 of one leg while the spindle member 24 of another hinge unit 23 telescopingly extends into the opposite end 22b of this tubular portion 22. Through this supporting arrangement, each tower leg is mounted on the tower platform 12 so as to be pivotable about the cylindrical, i.e., pivot, axes of its supporting spindle members.

Each hinge unit 23 is separately secured to the lower side of platform 12. This securing may be accomplished by conventional fastening means such as threaded nuts which pass through aligned apertures in the hinge unit 23 and the platform 12 and are secured by threaded nuts. For example, a plurality of apertures 27a may be formed in each mounting plate 27 with aligned apertures being formed in the mounting plate 28. Bolts 30 passed through these aligned apertures and through apertures in the platform 12 may serve to detachably secure the hinge units 23 to the platform. As shown in FIGURES 1 and 2, each hinge unit 23 may be mounted such that its coupling member 29 lies outside the periphery of platform 12.

If desired, a personnel railing 31 may be mounted upon the hinge units 23 carried by platform 12. Personnel railing 31 may comprise a guard rail 32 connected to the platform 12 by supporting posts 33. Each supporting post 33 may be detachably connected to a coupling member 29 by conventional means such as a threaded nut and bolt assembly 34, the bolt of which passes transversely through aligned apertures in each telescopingly arranged connecting post 33 and coupling member 29, as shown in FIGURE 4.

It will be understood, of course, that the mounting plates 27 should be of a thickness at least equal to and preferably slightly exceeding the wall thickness of tubular portions 22. This dimensioning will provide sufficient clearance between the hinge spindle members 24 and 25 and the lower surface of the platform 12 so as to allow for the pivotable movement of the tubular portions 22.

The axis of hinge unit 17 is located in relation to the pivot axis of tubular portion 22 of leg unit 21 so as to allow for adequate freedom of pivotal movement of the leg 21. By appropriately dimensioning the components of the leg 21, and possibly by positioning the pivot axis of hinge 17 somewhat inwardly of the pivot axis of tubular portion 22 of leg 21, the leg 21 may be pivoted from the converged leg position shown in FIGURE 6 through an approximately semi-circular arc so as to extend more or less perpendicularly from the top of the platform 12. This freedom of leg movement facilitates tower erection operations to be hereinafter described.

As will be apparent, when the leg unit 21 is pivoted to extend from the top of platform 12, lip 16 will be hinged about the pivot axis 17 so as to cause the top of this platform lip to fold over toward the top of the remainder of the platform 12.

In order to provide support for the pivoted platform lip 16 and enable it to be properly supported in coplanar relationship with the remainder of the platform 12, a pair of generally horizontally projecting supporting members 35 may extend from two hinge units 23 of an erected tower in the manner shown in FIGURES 2 and 3.

As shown in FIGURE 4, each supporting member 35 may be fabricated of cylindrical stock and supported on a hinge unit 23 with its cylindrical axis parallel to the plane of the cylindrical axes of the cylindrical spindle members 24 and 25. However, as shown in FIGURE 4, each such supporting member 35 may be mounted on its associated unit 23 so that the upper extremity 35a thereof is substantially aligned with the upper surface 27a of mounting plate 27. With this arrangement, the undersurface of hinged lip 16 is supported at the same elevation as the undersurface of the remainder of platform 12.

Each of the leg units, 19, 20, and 21, includes similar principal framing elements. Each such leg, as shown in FIGURE 2, incorporates an upper tubular portion 22 from which side-framing members 36 and 37 converge outwardly to a junction or apex 38. As will be apparent, in each leg, the combination of framing members 22, 36, and 37 defines an upper leg portion of triangular configuration.

Each leg unit includes a central, columnar support 39 which extends from the center of the tubular member 22 through the apex 38. Each such columnar unit 39 may be telescoping or extensible in character. Thus, in a manner akin to the extensible structure of the legs 3 of the inner tower 1, each columnar support 39 of the outer tower 2 may include a tubular end portion 40 which is telescopingly mounted within the outer end of an upper tubular member 41. Through conventional means such as an apertured portion 41a of the tubular member 41 and a plurality of axially spaced apertured zones 40a in extension 40, and through the use of a transverse fitting such as a threaded bolt 42 which extends through aligned apertures in columnar members 40 and 41, a desired length for each columnar support 39 may be achieved.

Each leg unit may include transverse framing within its triangular leg portion such as the framing members 43a and 43b incorporated in leg unit 20.

Leg unit 21, which is mounted with its pivot axis beneath and adjacent the axis of hinge 17, may be provided with a plurality of transversely extending and staggered framing members, such as members 44 and 45, which define ladder-like rungs. In order to facilitate the climbing of the tower leg 21, additional rung-like projections 46 may project laterally in a cantilever fashion from the portion of its columnar support 39, which extends beyond the apex 38.

The various components of each leg unit of the outer tower 2 may be interconnected by conventional securing techniques such as welding.

The arrangement of separate hinge units 23 shown in FIGURE 3, materially facilitates the replacement of leg units of the outer tower 2 which might become damaged. With one hinge unit 23 removed so as to free one end of a tubular portion 22 of a leg unit to be repaired, the other end of this tubular portion 22 may be moved axially and off of the hinge unit supporting this other end so as to completely free the leg from the tower platform 12.

The interrelationships of the various components of the composite tower structure of this invention, when the tower structure is in its operative or erected position, are shown in FIGURE 1. As there shown, the inner tower 1 is positioned within the outer tower 2 with the free ends of the columnar supports 39 of the leg units 19, 20, and 21 lying outside the inner tower 1. The upper extension 9 of the inner tower 1 projects upwardly through the aperture 18 in the outer tower platform 12. As shown, extension 9 projects from the end 7 of the lower, inner tower component 6, with the end 7 lying somewhat beneath the outer tower platform 12.

The railing 31, schematically illustrated in FIGURE 1, is mounted upon the tower platform 12 and supported by the supporting posts 33 which are connected with coupling members 29.

The platform lip 16 is supported by the projections 35 so as to lie coplanar with the remainder of the platform 12.

As will be appreciated, a surveying instrument such as a theodolite may be mounted upon the top portion 47 of inner tower 1. Personnel desiring to gain access to the platform 12 in order to position and use a surveying instrument, merely climb the ladder-like rungs 44, 45, and 46 of the leg unit 21. As personnel climbing this leg unit reach the tower platform 12, it may be desirable to hinge the platform lip 16 back onto the remainder of the platform to facilitate their gaining access to the platform top. While personnel are working on the platform 12, the railing 31 functions as a safety device in an obvious fashion.

As will be appreciated, with the arrangement of independent inner and outer towers shown in FIGURE 1, a surveyor may move on the platform 12 without disturbing a surveying instrument supported on the top of the extension 9 of the inner tower 1.

FIGURE 6 schematically illustrates the disassembled tower components. These components include the outer tower 2, the lower portion 6 of the inner tower 1, the upper extension portion 9 of the inner tower 1 and the safety railing 31 which, for convenience, is schematically shown as an assembled unit. It will be understood, of course, that railing 31 may comprise individual components which may be individually carried to the platform 12 and there assembled by conventional techniques.

Outer tower 2, as shown in FIGURE 6, has been collapsed by hinging the tower leg units 19, 20, and 21 inwardly so as to converge the outer or free extremities of these tower legs into abutting relationship. In this converged leg position, and owing to the triangular and outwardly converging character of the leg units, the tower will have assumed a pyramidal form, converging inwardly away from the platform 12.

The pyramidal, collapsed outer tower 2 and the inner tower component 6 may be conveniently nested together so as to facilitate storage and/or transportation of the tower assembly. With the outer tower 2 positioned as shown in FIGURE 6, the converged outer ends of the tower legs may be advanced into the open base of the inner tower portion 6 and moved generally axially through the interior of this tower portion until the outer extremities of the columnar supports 39 project through the triangular opening of the tower portion 6 defined by framing members 8, as shown in FIGURE 5. Desirably, the outer tower 2 will be advanced sufficiently far into the inner tower portion 6 so that the tower platform 12 is nested within the interior of the base of the tower portion 6 in the manner shown in FIGURE 5. In this position, the platform 12 lies inside the extremities of the inner tower component 6 as defined by the free ends of the leg extensions 10. As is obvious, this nesting is facilitated by the pyramidal form of the collapsed, outer tower 2.

It will be understood that maximum space savings may be accomplished by telescoping the extensible leg portions 10 into the tubular leg bodies 11 of the inner tower 1 and by similarly collapsing the extensions 40 of the columnar supports 39 of the leg units of the outer tower 2.

The inter-nested outer tower 2 and inner tower component 6 may be conveniently transported by cradling these components on framing 48 carried on the rear of a small truck such as the pickup truck 49 schematically shown in FIGURE 5 The remaining tower components may be carried in the remaining space in the back of the pickup truck 49.

After separated tower components have been delivered to a work site, the tower may be erected by following erection procedures schematically illustrated in FIGURES 7 through 16.

One erection procedure which may be followed is illustrated in FIGURES 7 through 11, 12a, 13, 15, and 16.

An alternate erection procedure is illustrated in FIGURES 7 through 11, 12b, 14, 15, and 16. Both of these erection procedures entail common, preliminary manipulative steps shown in FIGURES 7 through 11.

In the preliminary manipulative steps which are common to either preferred erection procedure, the outer tower 2 is placed upon a ground surface or other supporting medium with its legs converged. In this position, the tower platform 12 extends generally transversely of the supporting surface, as shown in FIGURE 7, so as to cause the pivot axes of leg 21 and hinge 17 to project upwardly and transversely from the supporting surface as shown. With the tower leg units 19 and 20 remaining converged, a workman 50 may grasp the end of the leg unit 21 and pivot this leg unit through an approximately semicircular arc so that it assumes the position shown in FIGURE 8. In this position, the leg unit 21 extends generally transversely or perpendicularly away from the top of the tower platform 12, in a direction in which the converged leg units 19 and 20 extend.

The outer tower 2 may then be rotated about the edge of platform 12 so as to cause the pivot axis of leg 21 to lie adjacent and substantially parallel to the ground surface as shown in FIGURE 9. The extremities of the extension portions 40 of the leg units 19 and 20 may then be secured against sliding movement on the supporting ground surface. Such securing may be conveniently accomplished by positioning the ends of the extensions in shallow depressions dug in the ground surface.

With the tower arranged as shown in FIGURE 9, the ladder-like, leg unit 21 lies substantially flush with the supporting ground surface. In order to erect the outer tower 2, a workman 51 may manually raise the tower platform 12 while another workman 50 grasps the outer end of the leg unit 21 and moves the extension end 40 of the leg unit 21 toward the platform 12, as shown in FIGURE 10. As will be appreciated, continued convergence of the end 40 of the leg unit 21 toward the tower 2 will cause the legs 20 and 19 to pivot about the extremities of their end portions 40 so as to elevate the tower platform 12, and thus cause the tower 2 to assume the erected position shown in FIGURE 11, over a desired work site.

Figure 13:
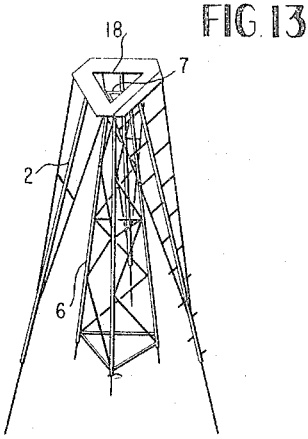

In the erection procedure involving the steps illustrated in FIGURES 12a and 13, the inner tower portion 6 is manipulated by workmen 50 and 51 as shown in FIGURE 12a so as to be moved beneath the erected outer tower 2, and caused to assume the position shown in FIGURE 13. In the position shown in FIGURE 13, the top portion 7 of the tower component 6 is disposed beneath, but aligned with, the opening 18 in the tower platform 12.

In following the erection procedure illustrated in FIGURES 12a and 13, the telescoping ends of the legs of both the inner tower component 6 and the outer tower 2 then be telescoped outwardly to the desired degree prior to the manipulation of either tower. Thus, while the outer tower 2 is in the position shown in FIGURE 7, the extensions 40 of each leg unit could be positioned as desired. Before the inner tower section 6 was erected, the extensions 10 of the leg portions 11 of this tower would be similarly extended.

Figure 14:
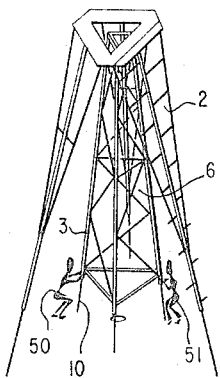

In the alternate erection procedure involving FIGURES 12b and 14, the inner tower component 6, rather than the outer tower 2, is first positioned over a desired site. The workmen 50 and 51 may then grasp two leg units of the outer tower 2 and maneuver the outer tower to a position over the installed inner tower component 6. This maneuvering may be facilitated by converging the ends of the leg units to the maximum extent possible, consistent with the clearance required to move around the tower unit 6. This convergence will elevate the tower platform 12 to the maximum degree and thus obtain maximum clearance between the platform 12 and a top portion 7 of the inner tower component 6.

In practicing the erection technique shown in FIGURES 12b and 14, it may be desirable to defer the extension of the portions 10 of the legs 11 of inner tower 1 until after the outer tower 2 has been manipulated over the inner tower section 6 as shown in FIGURE 14. In thus delaying the extension of the legs of tower section 6, maximum clearance will be provided between the tower section 6 and the outer tower 2 while the relatively more cumbersome outer tower 2 is being manipulated.

When the outer tower 2 and the inner tower section 6 have been properly erected, a workman may climb the tower leg 21 and carry with him the upper extension 9 of the inner tower 1 so as to complete the erection of the inner tower. As previously noted, the top 7 of the tower section 6, which is connected to the base of the tower extension 9, is positioned below the aperture 18 of the tower platform 12, but lies in such proximity to this aperture as to enable a workman to conveniently effect the joining of the inner tower components 6 and 9.

Figure 15:
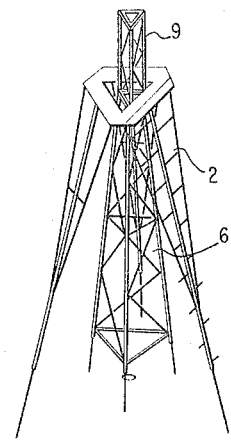
Figure 16:
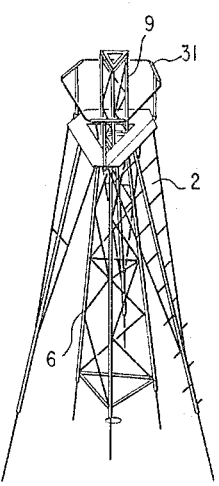

With the erection of the inner tower 1 completed as shown in FIGURE 15, with the upper portion 9 of this tower projecting upwardly through the aperture 18 of the platform 12 of the outer tower 2, a surveying instrument may then be mounted upon the top of the extension 9. If desired, in order to properly insure the safety of workmen or surveyors, the railing 31 may be installed on the tower platform 12 as shown in FIGURE 16. As will be appreciated, the railing 31 may be carried as a unit or in components up the ladder 21 and connected to the coupling units 29.

Having described the structure of the preferred composite tower embodiment of this invention and preferred modes of erection and storage of this tower structure, several of the advantages which may be attributed to the invention have been made apparent.

Through the use of the sectional, but rigid, inner tower structure and the pivotable leg carrying outer tower, ease of erection of the composite tower assembly is insured. A tower having a height of twenty-five feet may be readily erected by a crew of only two workmen.

The rigid nature of the inner tower is such as to insure maximum stability of this tower component, so as to afford properly stabilized support for a surveying instrument.

The tedious and time-consuming erection of a composite tower by assembling a vast number of separate elements is effectively avoided. The manipulative handling and transporting problems associated with completely prefabricated tower structures are similarly avoided.

Particular advantages reside in the manner in which the collapsible outer tower may be nested or stored within the inner tower, even though the outer tower is of a larger size than the inner tower when erected. This not only accomplishes a significant space savings when the tower is to be stored, but enables the tower to be transported on a small truck, such as a pickup truck, to sites which might be inaccessible to larger vehicles.

The unique hinge structure incorporated with the platform of the outer tower constitutes a structurally simple arrangement for stable supporting tower legs for pivotable movement, while facilitating the replacement of tower legs which may become damaged. The inherent ruggedness and simplicity of this hinge structure insures maximum operating life of the tower, with nominal maintenance and minimum initial cost. This hinge structure enables the unique leg-hinging action heretofore described, which facilitates the erection of the outer tower by a minimum number of workmen.

While the invention has been described with reference to preferred embodiments, it will be apparent to those skilled in the art that certain additions, deletions, modifications, and substitutions may be made with respect to the disclosed tower structure and tower storage and erection procedures which would be within the purview of the invention as defined in the appended claims.

What is claimed is:
1. A method of storing a composite tower structure which includes inner and outer tower components, said method comprising:
   pivoting the legs of said outer tower about a top platform thereof so as to bring the extremities of said legs into converged relationship;
   inserting the converged extremities of the legs of said outer tower component into the base portion of said inner tower; and
   advancing said outer tower component into the interior of said inner tower component until the top platform of said outer tower component is telescoped within the base portion of said inner tower component.
2. A method as described in claim 1 wherein said outer tower component is advanced into the interior of said inner tower component until the extremities of the converged legs of said outer tower component project through a top portion of said inner tower component.
3. A composite tower structure comprising:
   an inner tower including a plurality of rigidly secured legs;
   an outer tower including a plurality of legs, with each such leg being pivotably connected to a top platform thereof;
   the base of said inner tower having a cross sectional configuration defined by the rigid legs thereof, which cross sectional configuration is larger than the peripheral configuration of the top portion of said outer tower;
   said legs of said outer tower being so pivotably mounted as to enable the free extremities thereof to be converged into abutting relationship;
   the converged extremities of the legs of said outer tower being adapted to be moved from the base portion of said inner tower through the interior thereof until the top platform of said outer tower is nested within the base portion of said inner tower; and
   said pivotable legs of said outer tower being mutally independent, with adjacent pivotable legs of said outer tower being mutually diverging downwardly away from said platform and defining a wholly unobstructed, downwardly enlarging opening through which said inner tower may be generally laterally moved.
4. A method of erecting a composite tower structure including inner and outer tower components, said method comprising:
   pivoting one leg of said outer tower about a top platform thereof until said leg extends away from said top platform in a direction generally opposite to the direction in which other legs of said outer tower extend, said one leg being pivoted about a hinge axis extending generally transversely of a surface upon which said tower structure is to be supported;
   rotating said outer tower about the top platform thereof to cause said pivot axis of said one leg to lie adjacent and substantially parallel to said supporting surface;
   securing the extremities of said outer legs of said outer tower so as to substantially prevent movement of said leg extremities along said supporting surface;
   moving the free extremity of said one leg toward the top platform of said outer tower to effect the elevation of said top platform; and
   relatively positioning said outer and inner towers so that the legs of said outer tower are positioned outwardly of said inner tower.
5. A method as described in claim 4 wherein an upper detachable portion of said inner tower is connected to said inner tower so as to project upwardly through an aperture of said top platform of said outer tower subsequent to said relative positioning of said inner and outer towers.
6. A method as described in claim 5 wherein a surveying instrument is mounted on said inner-tower, detachable portion subsequent to the attachment of said detachable portion to said inner tower.
7. A composite tower structure comprising:
   a rigid inner tower;
   an outer tower including a top platform with a plurality of legs pivotably connected thereto;
   said top platform of said outer tower being apertured to allow an upper portion of said inner tower to projects therethrough;
   said pivotable legs of said outer tower being mutally independent, with adjacent pivotable legs of said outer tower being mutually diverging downwardly away from said platform and defining a wholly unobstructed, downwardly enlarging opening through which said rigid inner tower may be generally laterally moved.
8. A composite tower structure comprising:
   an inner tower including a plurality of rigidly secured legs;
   an outer tower including a plurality of legs, with each such leg being pivotably connected to a top platform thereof;
   the base of said inner tower having a cross sectional configuration defined by the rigid legs thereof, which cross sectional configuration is larger than the peripheral configuration of the top portion of said outer tower;
   said legs of said outer tower being so pivotably mounted as to enable the free extremities thereof to be converged into abutting relationship;
   the converged extremities of the legs of said outer tower being adapted to be moved from the base portion of said inner tower through the interior thereof until the top platform of said outer tower is nested within the base portion of said inner tower; and
   said legs of said outer tower being pivotably connected to the top platform thereof by a plurality of separate hinge units, each such hinge unit including a pair of spindles, with each such spindle being telescopingly connected with one end of one leg of said outer tower so as to allow pivotable movement of this leg about said spindle.
9. A composite tower structure comprising:
   a rigid inner tower; and
   an outer tower including a top platform with a plurality of legs pivotably connected thereto;
   said top platform of said outer tower being apertured to allow an upper portion of said inner tower to project therethrough;
   said inner tower including:
      a rigid lower portion, the top of which terminates beneath the top platform of said outer tower, and
      a rigid upper portion detachably connectable with said rigid lower portion and adapted to project from the top of said lower portion of said inner tower through the apertured portion of the top platform of said outer tower.
10. A composite tower structure comprising:
   a rigid inner tower; and
   an outer tower including a top platform with a plurality of legs pivotably connected thereto;
   said top platform of said outer tower being apertured to allow an upper portion of said inner tower to project therethrough; and
   each pivotable leg of said outer tower including a generally triangular portion adjacent the top platform of said outer tower, with the sides of said triangular portion converging away from said top platform, and each pivotable leg further includes a columnar support extending from said triangular portion to a surface adapted to support said tower structure.

11. A tower structure as described in claim 10 wherein said columnar portion of each leg extends through the triangular portion thereof and wherein each triangular leg portion includes a tubular member pivotably attached to the top platform, with said columnar leg portion being connected to said tubular leg portion.

12. A composite tower structure comprising:
a rigid inner tower; and
an outer tower including a top platform with a plurality of legs pivotably connected thereto;
said top platform of said outer tower being apertured to allow an upper portion of said inner tower to project therethrough; and
said legs of said outer tower being pivotably connected to the top platform thereof by a plurality of separate hinge units, each such hinge unit including a pair of spindles, with each spindle being telescopingly connected with one end of one leg of said outer tower so as to allow pivotable movement of this leg about said spindle.

13. A tower structure as described in claim 12 wherein said hinge units of said outer tower are spaced from the peripheral edge of the top platform thereof and are secured to the lower side of said top platform; said top platform of said outer tower including a hinged portion along one side, with said hinged portion being adapted to be pivoted sufficiently so as to allow a leg adjacent thereto to be pivoted about said top platform through a semi-circular arc.

14. A hinge structure for a tower, said hinge structure comprising:
a plurality of mutually spaced hinge units detachably mounted upon the lower side of the top platform of said tower and adapted to pivotably support tower legs;
each said hinge unit including a first portion which engages and supports one side of one tower leg so as to allow pivotable movement of said one tower leg in relation to said top platform;
each said hinge unit further including a second portion which engages and supports one side of another tower leg so as to allow pivotable movement of said other tower leg in relation to said top platform; and said first and second portions of each hinge unit being rigidly interconnected, with the pivot axes thereof being mutually inclined.

15. A hinge structure as defined in claim 14 wherein said hinge units are mounted upon the lower side of a tower top platform which has a generally triangular peripheral configuration, with there being a hinge unit at each triangular corner of said platform.

16. A hinge structure as defined in claim 14 wherein each hinge unit includes a pair of spaced mounting plates positioned on opposite sides of said interconnected first and second portions of each hinge unit, with there being coupling means extending between said plates and adapted to support a portion of a tower railing.

17. A hinge structure as defined in claim 14 wherein said tower top platform includes a lip portion on one side pivotably mounted to the remainder of said top platform and wherein a plurality of said hinge units include rigid projections adapted to support said top platform lip portion in generally coplanar relationship with the remainder of said top platform.

18. A hinge structure as described in claim 14 wherein said first and said second hinge unit portions each comprise spindle members which are joined so that the cylindrical axes thereof are coplanar and substantially parallel to said top platform, each said tower leg including a tubular member adapted to pivotably connect each leg to said top platform, each such tubular member having open ends, with one spindle member of one hinge unit extending into one open end of a tubular portion of one leg and with one spindle member of another hinge unit extending into the other open end of said tubular portion of said one leg

References Cited by the Examiner
UNITED STATES PATENTS

| | | | |
|---|---|---|---|
| 1,030,640 | 6/1912 | Bowers | 52—646 X |
| 1,054,737 | 4/1913 | Woodbury | 52—123 X |
| 1,816,715 | 7/1931 | Barnhart | 52—638 |
| 3,011,586 | 12/1961 | Harvey | 52—646 X |
| 3,204,721 | 9/1965 | Park | 182—115 |

HARRISON R. MOSELEY, *Primary Examiner.*

J. K. BELL, *Assistant Examiner.*